Figure 1:
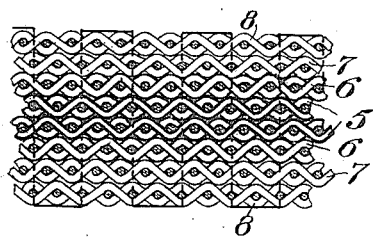

K. W. JAPPE.
BELTING.
APPLICATION FILED FEB. 16, 1911.

1,165,780.  
Patented Dec. 28, 1915.

UNITED STATES PATENT OFFICE.

KURT WADE JAPPE, OF BROOKLYN, NEW YORK.

BELTING.

1,165,780.  Specification of Letters Patent.  Patented Dec. 28, 1915.

Application filed February 16, 1911. Serial No. 608,963.

*To all whom it may concern:*

Be it known that I, KURT WADE JAPPE, a citizen of the United States, residing at 919 Greene avenue, Brooklyn, in the county of Kings and State of New York, have invented certain new and useful Improvements in Belting, of which the following is a specification.

This invention relates to belting adapted to be used in the transmission of power through the medium of pulleys and its novelty consists in the construction and adaptation of the parts, as will be more fully hereinafter pointed out.

It is now usual in the preparation of stitched canvas belting to make the same by stitching together plies of canvas suitably folded, the number of plies used depending upon the strength or thickness required in the finished belt. The material thus prepared is then soaked in a mixture of oils, waxes and gums for the purpose of increasing its strength, power of adhesion, resistance to stretching and the like. It is then usually painted and put aside to season, in some cases simply by exposure to the atmosphere and in others under conditions of tension in order to eliminate some of the tendency to stretch. When a belt so prepared is finished, it is either soft throughout or soft in the inner plies and hard and tough in the outer plies. If it is soft throughout, the belt will not take a proper set in the stretching process and will stretch excessively when put into use and will not afford proper hold to the fastenings. It will also rapidly wear out. If it is soft in the inner plies and tough in the outer plies it will be stiff and will not readily yield in bending. When forced around a small pulley it will soon crack on the face next to the pulley and the outer plies will soon crack so that the fastenings will tear out.

It is evident that a belt properly to transmit power should have strength to resist strains without breaking or stretching excessively; flexibility, to enable it to round the pulleys easily; and elasticity, to take up sudden inequalities in the load, and that it should furthermore present a smooth, soft and pliable face so that it may hug a pulley closely and transmit its full power running slack without slipping. Some of these requirements are opposed to one another and are not to be found in any one material known to me, so that it is evidently necessary to have a hard, tough and comparatively unyielding material to supply strength and prevent excessive stretch and a soft, elastic material to furnish pliability and elasticity.

Another matter must be considered. When a belt passes around a pulley there is a certain portion of it which does not change in length. Its outer fibers are stretched and its inner fibers are contracted. These variations being corrected as the belt leaves the pulley. This is of course ignoring the elongation and contraction due to the difference in tension between the tight and slack sides of the belt in transmitting power.

I have discovered that I can produce a belt having almost ideal qualities by preparing the various plies separately, treating them to secure or preserve different qualities of pliability and elasticity, hardness, toughness or rigidity and then uniting them into one compound whole by securing such plies together by any suitable means such as riveting or stitching or by suitable intermediate adhesives.

Figure 2:
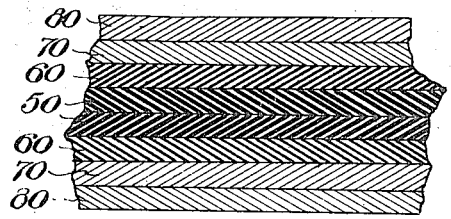

In the accompanying drawing I have illustrated in an exaggerated form, the relative position of the different plies of the belt, Figure 1 showing a small section of the belt of stitched canvas and Fig. 2 showing diagrammatically the arrangement of the plies, and indicating the different degrees of treatment by lines more or less dark.

In Fig. 1, I have shown the two middle plies, 5, darker than the other plies and the plies 6, 7, and 8 on each side gradually lightening to indicate a lesser degree of treatment.

In Fig. 2 the idea of the different treatment of the different plies is more clearly brought out. The two inner plies, 50, being shown with very heavy section lines and the outer plies of each side at 60, 70, and 80 are shown in section by lines of gradually decreasing thickness, to indicate that while the central plies are treated in a manner to make them stiff and unyielding to a large extent, the other plies, 60, 70, 80, are progressively treated to a lesser degree so that the outer plies 80, have sufficient elasticity to stretch when bent around a pulley, while the plies next to the pulley, being equally soft and flexible, will be crowded together and more closely hug the pulley, producing a greater friction therewith.

As an example of the manner in which I prefer to carry out my invention, I take several pieces or plies of soft and relatively elastic material such as stitched canvas each woven into the proper form to constitute one ply in the finished belt. Say that I desire to make the belt of 8-ply: I then treat, say two of these pieces, in the usual manner with waxes, gums and oils until they are thoroughly saturated or indurated and if necessary hang them up to season with or without tension therein as the resulting use to which it is to be put shall determine. This makes two plies of hard, tough and unyielding material. I then take two other plies of the same or even of different material and treat them with the same or different materials as before but not to the same extent, in order to produce as a result a material which will be hard, tough and unyielding but not to the same extent as before. I then take two further plies and treat them to an even less degree and finally the remaining two pieces I let alone and do not treat at all. I now assemble these pieces, supposing that the resulting belt is to be used for ordinary purposes as follows: I place the toughest and hardest pair in the middle. On each side of these I place one member of each pair next made, and outside of these the members of the third pair and finally on the outside of the whole the least treated or original untreated canvas. I then secure the different plies together and I have the finished belt with a soft pliable surface on each face readily conforming to the pulley, giving contact over its entire area. It also has a tough unyielding core giving strength and preventing excessive stretching. The intermediate plies partake of the qualities of both the inner and outer plies as above stated. Such a belt with plies of progressively varying degrees of hardness, toughness and strength from the outer toward the inner layers will transmit a normal load without excessive initial tension thus lengthening the life of the belt, avoiding frequent taking up and preventing excessive pressure on the journals. The outer ply being soft its fibers will not crack, and the belt will move more readily around the pulley than a harder belt and it can be used on a pulley of small diameter and at much higher speed than any belt of similar strength known to me. This applies to a belt having a soft face and a hard core.

I may, however, vary the detail of the invention without departing from its principle. For instance, I may make the compound belt of plies having one outer face soft and the other outer face hard with intermediate plies if used of varying degrees of hardness or softness.

Sometimes it will be difficult to secure progressively increasing qualities of hardness in the qualities of the different plies. In such case I propose to treat all of the plies which are treated at all, with substantially the same indurating compound and then to reduce these qualities more or less in a portion of the fabric by dissolving out a portion of the indurating material. Another method is to fashion the plies and secure them together and treat them as a whole so that the resulting belt changes from a soft elastic material to a strong, hard and tough material gradually and imperceptibly and without any line of demarcation between the successive layers of varying characteristics. It might be added also that belts of this class are usually painted before use.

What I claim as new is:—

1. A compound material adapted to be used for a belt for the transmission of power, or the like, comprising a plurality of plies, the outer plies being made of soft elastic material and the innermost ply of strong, hard and tough material and intermediate plies being made of material less strong, hard and tough than that of the inner ply and less soft and elastic than the outer plies.

2. A belt made of different materials of varying degrees of flexibility and toughness suitably secured together in plies and progressively and gradually increasing in softness and elasticity from the center to both surfaces.

3. A belt made of different materials of varying degrees of flexibility and toughness suitably secured together in plies and progressively decreasing in softness and elasticity and progressively increasing in hardness, toughness and strength from the outer plies toward the center.

4. A belt comprising a plurality of plies changing gradually and imperceptibly from soft elastic material for the outer plies to a strong, hard tough material for the inner or central ply.

In testimony whereof I have affixed my signature in presence of two witnesses.

KURT WADE JAPPE.

Witnesses:
 CHAS. E. MACHOLD,
 LEWIS H. VAN DUSEN.